Oct. 12, 1948.　　　　　H. L. HULL　　　　　2,451,166
TIRE PRESSURE ALARM SWITCH
Filed Jan. 30, 1946
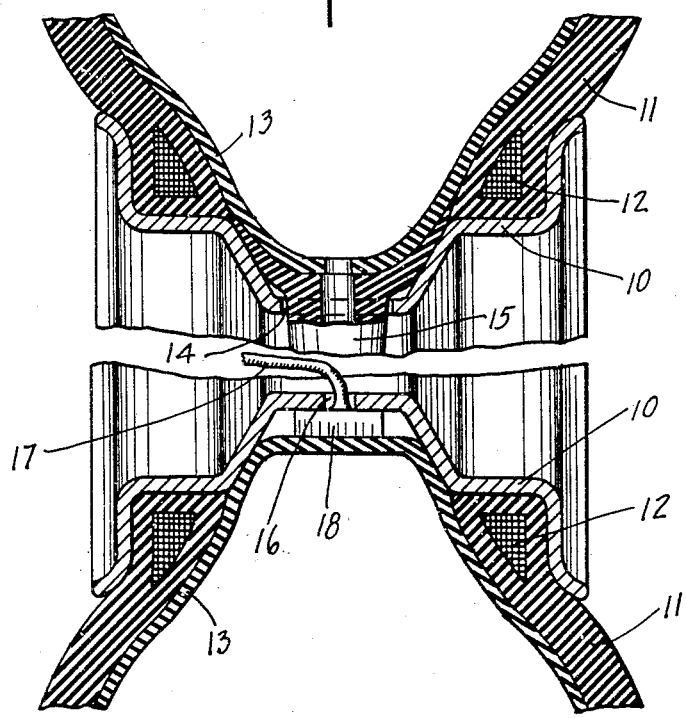
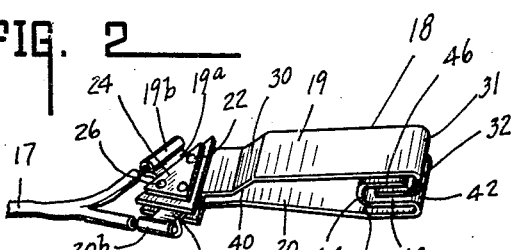
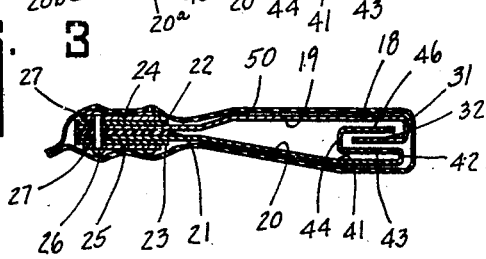
INVENTOR.
HOWARD L. HULL.
BY
Lockwood, Goldsmith & Galt.
ATTORNEYS.

Patented Oct. 12, 1948

2,451,166

UNITED STATES PATENT OFFICE 2,451,166

TIRE PRESSURE ALARM SWITCH

Howard L. Hull, Anderson, Ind.

Application January 30, 1946, Serial No. 644,291

7 Claims. (Cl. 200—58)

This invention relates to a tire pressure indicating switch.

The chief object of the present invention is to simplify the construction of switches of the aforesaid type and particularly warning systems wherein excess tire pressure as well as deficient tire pressure is indicated on or by the same signal or warning device.

For a better understanding of the present invention reference is had to the prior Patent No. 2,215,153 dated September 17, 1940, which is more or less representative of this art and the principles involved.

Therein, as herein, there is interposed between the tube of a tired wheel and the rim associated therewith and between the casing beads, a switch which is responsive to pressure. The insulated leads thereto are introduced through a rim opening. For balancing purposes this may be diametrically opposite the valve stem opening in such rim.

The signal, one for each tire, is connected to ground. Each signal also is connected to the switch through any suitable means at each wheel, such as illustrated in the aforesaid patent, and to a source of energy also grounded.

When tire pressure exceeds a predetermined maximum, or when the pressure decreases to a predetermined minimum, the signal for that tire is energized thus giving warning of the dangerous condition of the tire which then may be corrected before a blow-out or complete deflation occurs respectively.

The chief feature of the present invention resides in the switch per se and its balancing position on the tired rim.

Other objects and features of the invention will be set forth more fully hereinafter.

The full nature of the invention will be understood from the accompanying drawings and the following description and claims:

In the drawings

Fig. 1 is a diametral sectional view of a tired wheel rim, intermediate portions being broken away and omitted in view of the disclosure in the aforesaid patent and others of like character, the switch per se being shown in elevation.

Fig. 2 is a perspective view of the switch structure, the flexible insulated covering being omitted.

Fig. 3 is a longitudinal sectional view of an insulation covered embodiment of the invention.

In Fig. 1 of the drawings, 10 indicates a conventional wheel rim with casing 11 thereon having beads 12 and same enclose tube 13 in the usual manner. Rim 10 is apertured at 14 for tire valve stem 15 and is diametrically apertured at 16 for conductor or cable 17 passage therethrough. Between beads 12, rim 10 and tube 13 is pressure responsive switch 18 connected to cable 17, a warning signal and source of energy not shown. Thus the structure is more or less balanced.

Referring more particularly to Figs. 2 and 3 wherein the switch 18 includes two spring contact leaves 19 and 20, interposed therebetween at the physically connected ends thereof is insulation plate 21. On the opposite sides of leaves 19 and 20 are insulation plates 22 and 23 respectively, and beyond same are the clamping plates (usually metallic) 24 and 25 respectively. Rivets 26, insulated from the leaves at 27, rigidly secure all the aforesaid together.

Herein the assembled portion is generally triangular in outline and each leaf has a tail designated by the subscript "a" projecting from the assembly as shown and curled, see subscript b, to take the wire ends of the two conductors in cable or conduit 17.

As illustrated leaf 19 is offset at 30 and its end 31 is turned back as at 32 to lie substantially parallel to the leaf proper and appreciably spaced therefrom. The resiliency and spacing determine the pressure range over which the switch is in open circuit condition.

Leaf 20 is offset as at 40 and 41 and its end 42 is turned back as at 43 to lie upon outside of end 32. This portion 43 is curved reversely as at 44 to provide tongue 46. Portion 44 is closer to the assembled portions than the immediate end of portion 32 and normally free end 46 is positioned midway between free end 32 and the portion of leaf 19 spaced therefrom.

Obviously the leaf immediately resting upon the rim should be insulated therefrom in a two-wire system. Since either leaf may rest thereon, it is preferred to insulate each leaf against rim grounding. Furthermore, to prevent water shorting, corrosion, accidental contact shorting etc., this protection is provided in the form of a rubber sheath 50, see Fig. 3 which forms a housing that may be slipped over the switch and same may be in the form of what is called a sheath or small finger stall. It may, however, be permanently anchored at the base thus preventing tampering with the switch. Preferably it also encompasses the projections 19$^a$ and 20$^a$ and the curls 19$^b$ and 20$^b$ as well as the wire connections thereto.

The leaves may be and preferably are of the same width so they may be fabricated from strip stock and from the same reel thereof. Since no moving end of the switch is positioned at the housing, the same will not wear, rupture or tear same, see the curved ends 31 and 42. Obviously portion 43 may be positioned adjacent leaf 20 at any desired distance or even contact same for stiffening purposes.

In operation if leaf 19 is closest to the rim, it is relatively stationary, and high pressure is indicated either when portion 46 contacts 19 or portion 43 contacts free end 32. Low pressure is indicated only when portion 46 contacts free end 32.

If leaf 20 is closest to the rim high pressure is indicated when either contact 19 engages the relatively stationary portion 46 or free end 32 engages relatively stationary portion 43. Low pressure is indicated only by free end 32 contacting free end 46.

Thus it is immaterial which way the switch 18 is interposed between the tube and rim for warning purposes relative to high and low pressure condition indications.

The switch 18, see Fig. 1, need not necessarily be applied as illustrated therein. It is, however, usually applied from the so-called brake drum side of the wheel.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. In a pressure operated switch adapted for placement between a wheel rim and inner tube of a pneumatic tire thereon for indicating excessive and deficient pressure conditions of tube inflation, a switch device wholly concealed within the rim comprising a pair of contact leaves secured together in electrically insulated relation at one end, a return bend portion at the other end of each of said leaves, the returned portion of at least one leaf being spaced from the body portion thereof, and a second outwardly directed leaf bent from the returned portion of one leaf and spaced from its supporting returned portion and interleaved between the first mentioned and spaced returned portion and its supporting leaf, the first mentioned returned portion being interleaved between the second mentioned returned portion and the outwardly directed leaf.

2. A switch as defined by claim 1 wherein each of the leaves, free ends and return bend portions are of approximately the same width and the effective overall length of the leaves is approximately equal.

3. A switch as defined by claim 1 wherein each end edge of the free end of each leaf is guarded within a return bend, the effective ends of the leaves being of return bend character.

4. A switch as defined by claim 1 wherein each contact leaf is of strip material and on its outer face is provided with insulation for prevention of tube cutting.

5. A switch as defined by claim 1 wherein the contact leaves are of strip material and are enveloped within a flexible, pressure responsive, electrical insulation, housing for prevention of tube cutting.

6. A switch as defined by claim 1 wherein the contact leaves are of strip material and are enveloped within a flexible, pressure responsive, electrical insulation, housing for prevention of tube cutting, each of the leaves, free ends and return bend portions are of approximately the same width and the effective overall length of the leaves is approximately equal, the return bend ends preventing housing rupture.

7. A switch as defined by claim 1 wherein the contact leaves are of strip material and are enveloped within a flexible, pressure responsive, electrical insulation housing for prevention of tube cutting, each end of the free end of each leaf is guarded within a return, the effective ends of the leaves being of return bend character to prevent housing rupture.

HOWARD L. HULL.

REFERENCES CITED

The following references are of record in the file of this patent:

UNITED STATES PATENTS

| Number | Name | Date |
|---|---|---|
| Re. 20,351 | Rodney | May 4, 1937 |
| 494,345 | Pearce | Mar. 28, 1893 |
| 2,215,153 | Hull | Sept. 17, 1940 |
| 2,227,802 | VanVleck | Jan. 7, 1941 |